(12) United States Patent
Hampf et al.

(10) Patent No.: US 12,307,755 B2
(45) Date of Patent: May 20, 2025

(54) READING A ONE-DIMENSIONAL OPTICAL CODE USING A BLACK-AND-WHITE PROFILE FORMED FROM GRAYSCALE VALUE PROFILES

(71) Applicant: SICK AG, Waldkirch (DE)

(72) Inventors: Marcel Hampf, Waldkirch (DE); Romain Müller, Waldkirch (DE); Thorsten Falk, Waldkirch (DE); Julian Zimmer, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/197,916

(22) Filed: May 16, 2023

(65) Prior Publication Data
US 2023/0394259 A1 Dec. 7, 2023

(30) Foreign Application Priority Data
Jun. 7, 2022 (EP) ..................................... 22177569

(51) Int. Cl.
| | |
|---|---|
| *G06V 10/82* | (2022.01) |
| *G06K 7/14* | (2006.01) |
| *G06N 20/00* | (2019.01) |
| *G06V 10/44* | (2022.01) |

(52) U.S. Cl.
CPC ........... *G06V 10/82* (2022.01); *G06K 7/1413* (2013.01); *G06K 7/1482* (2013.01); *G06N 20/00* (2019.01); *G06V 10/454* (2022.01)

(58) Field of Classification Search
None
See application file for complete search history.

(56) References Cited

U.S. PATENT DOCUMENTS

| | | | |
|---|---|---|---|
| 8,576,446 B2 | 11/2013 | Tian et al. | |
| 2007/0164115 A1* | 7/2007 | Joseph | G06K 7/10722 235/462.25 |
| 2012/0018518 A1 | 1/2012 | Ström et al. | |

(Continued)

FOREIGN PATENT DOCUMENTS

| | | |
|---|---|---|
| EP | 2003599 A1 | 12/2008 |
| EP | 2415015 B1 | 2/2012 |

(Continued)

OTHER PUBLICATIONS

European Search Report issued on Nov. 7, 2022 for Application No. EP 22177569.5.

*Primary Examiner* — Suezu Ellis
(74) *Attorney, Agent, or Firm* — Nath, Goldberg & Meyer; Jerald L. Meyer; Morgan D. Rosenberg

(57) ABSTRACT

A method for reading a one-dimensional optical code, wherein image data including the code are captured and a plurality of grayscale value profiles through the code are obtained from the image data, a black-and-white profile is formed from the grayscale value profiles by binarization, and the code content of the code is read from the black-and-white profile, wherein, for preparing the binarization, a sharpened grayscale value profile is first generated from the plurality of grayscale value profiles, the sharpened grayscale value profile having, as compared to the original image data, increased resolution, sharper edges, and more pronounced extrema, and the sharpened grayscale value profile is binarized to form the black-and-white profile.

14 Claims, 5 Drawing Sheets

(56) References Cited

U.S. PATENT DOCUMENTS

Figure 1:
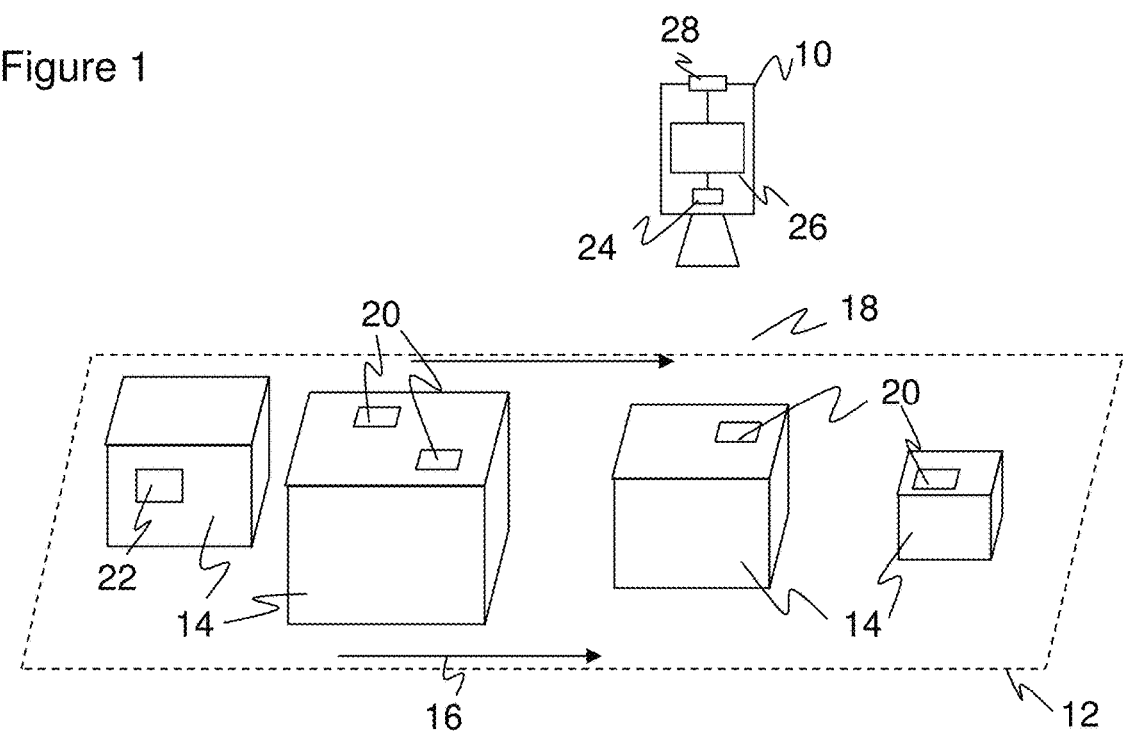

| | | | |
|---|---|---|---|
| 2017/0206391 A1* | 7/2017 | Lin | G06K 7/146 |
| 2019/0019086 A1* | 1/2019 | Schüler | G06K 7/1413 |
| 2020/0394376 A1 | 12/2020 | Xu et al. | |
| 2021/0073499 A1 | 3/2021 | Schüler et al. | |

FOREIGN PATENT DOCUMENTS

| | | |
|---|---|---|
| EP | 2555160 | 2/2013 |
| EP | 3428834 B1 | 1/2019 |
| EP | 3614298 A1 | 2/2020 |
| EP | 3764282 A1 | 1/2021 |
| EP | 3789906 A1 | 3/2021 |
| EP | 3812953 A1 | 4/2021 |
| EP | 3916633 A1 | 12/2021 |
| JP | 2008134710 A | 6/2008 |

* cited by examiner

Figure 5

```
model = keras.Sequential()
model.add(layers.Conv1D(4, kernel_size = 5, activation='relu', strides=1, padding='valid', input_shape=(3991,1)))
model.add(layers.Conv1D(8, kernel_size = 5, activation='relu', strides=1, padding='valid'))
model.add(layers.Conv1D(8, kernel_size = 5, activation='relu', strides=1, padding='valid'))
model.add(layers.Conv1D(8, kernel_size = 5, activation='relu', strides=1, padding='valid'))
model.add(layers.Conv2D(16, kernel_size = 5, activation='relu', strides=1, padding='valid'))
model.add(layers.Conv2D(16, kernel_size = 3, activation='relu', strides=1, padding='valid'))
model.add(layers.Conv1D(1, 1, activation='softmax', strides=1, padding='valid'))
```

READING A ONE-DIMENSIONAL OPTICAL CODE USING A BLACK-AND-WHITE PROFILE FORMED FROM GRAYSCALE VALUE PROFILES

The invention relates to a method for reading a one-dimensional optical code and to a code-reading device.

Code readers are known from supermarket checkouts, for automatic packet identification, sorting of mail items, from baggage handling in airports, and from other logistics applications. In a code scanner, a scanner beam is guided transversely over the code by means of a rotating mirror or a polygonal mirror wheel. A camera-based code reader captures images of the objects with the codes located thereon by means of an image sensor, and image evaluation software extracts the code information from said images.

In an important group of applications, the code-bearing objects are conveyed past the code reader. A code scanner detects the codes which are each successively guided into its reading zone. Alternatively, in a camera-based code reader, a line scan camera reads the object images with the code information successively and line-by-line with the relative movement. A two-dimensional image sensor regularly captures image data, which overlap more or less depending on the recording frequency and the conveying speed. A plurality of code readers are often provided in a reading tunnel in order to capture objects from several or all sides, so that the objects can be arranged in any orientation on the conveyor.

Although there are numerous types of two-dimensional optical codes, one-dimensional barcodes continue to play an important role. Barcodes consist of black bars and white gaps. By contrast, the image data scanned or captured for the code reading have grayscales, for example, grayscale values from 0 to 255 with a color depth of eight bits. With the exception of a few methods such as template matching, the decoders are unable to deal with the grayscale values. Therefore, the decoder is usually preceded by a binarization, converting the grayscale values into black-and-white values or a color depth of only one bit.

Binarization means a strong reduction in information. The decisive information about the widths of bars and gaps should not be lost in the process under any circumstances. A simple threshold value method suffices only under idealized conditions. In practice, this is not the case; there are various interfering effects such as insufficient focus, optical distortions, contamination, noise, motion blur, reflections, code damage, inadequate exposures, and much more.

Therefore, significantly more complex binarization algorithms are required to enable successful decoding. These include smaller optimizations, such as intelligent or local threshold value selection and pre-filtering. In the case of a differential method, the original grayscale value profile is extrapolated to localize edges and extrema. There are numerous optimizations for this purpose, too. In order to combine the advantages of different binarization algorithms, they are often executed in parallel, and the results are decoded separately.

Good results are achieved in many real code-reading situations with these conventional implementations of binarization. Nevertheless, there are still too many code detections where the quality of the binarization is inadequate. These are, for example, cases with high blurring, low signal-to-noise ratio, scanning effects, low contrast, low code resolution, and others. Combinations of such effects are particularly unfavorable. In this context specifically, there is a complexity in the interfering effects that already render a description extremely difficult and time-consuming, let alone developing suitable algorithms to counter the respective problem cases individually and in a targeted manner.

EP 2 003 599 A1 discloses an optoelectronic sensor for capturing codes, which binarizes the read color or grayscale value image data while they are being received and/or in real time. However, the document does not discuss a specific, detailed binarization algorithm.

EP 2 555 160 B1 finds regions of interest or code candidates in pre-processing on an FPGA by means of a contrast measure. This can be connected to a binarization, but this is not explained in any detail.

EP 3 428 834 B1 uses a classic decoder which operates with methods without machine learning in order to train a classifier configured for machine learning, or, more specifically, a neural network. The classic decoder is preferably configured to binarize the image data, but without it being explained how this binarization is executed in detail.

EP 3 916 633 A1 describes a camera and a method for processing image data, wherein segmentation by means of a neural network takes place in a streaming method, i.e., image data are already being processed while further image data are being read in. At least the first layers of the neural network can be implemented on an FPGA. In one embodiment, there is an additional processing path, which, in parallel with the neural network, performs pre-processing steps, such as the generation of a binary image, on a separate copy of the high-resolution output image using classic or learning methods. Again, the binarization is not discussed in more detail.

U.S. Pat. No. 8,576,446 B2 describes a method for image evaluation. In this case, a scanned grayscale value image is subjected to deblurring by means of deconvolution and binarization with adaptive thresholds. US 2020/0394376 A1 performs an increase in resolution by means of a neural network, and then binarization and decoding. This is not tailored to barcodes, i.e., one-dimensional codes, and, in the problematic situations described, the quality of the binarization can still be inadequate.

In a code reader according to EP 3 812 953 A1, additional algorithms are included in the decoding method as a function of a measured distance to the code. One of these additional algorithms can be a deblurring using Richardson-Lucy deconvolution. However, this is not associated with a binarization.

It is therefore an object of the invention to improve binarization for reading barcodes.

This object is satisfied by a method for reading a one-dimensional optical code, wherein image data including the code are captured and a plurality of grayscale value profiles through the code are obtained from the image data, a black-and-white profile is formed from the grayscale value profiles by binarization, and the code content of the code is read from the black-and-white profile, wherein, for preparing the binarization, a sharpened grayscale value profile is first generated from the plurality of grayscale value profiles, the sharpened grayscale value profile having, as compared to the original image data, at least one of increased resolution, sharper edges, and more pronounced extrema, and the sharpened grayscale value profile is binarized to form the black-and-white profile.

Throughout this specification, the term "barcode" is used synonymously with a one-dimensional optical code, deviating from parts of the literature, which also sometimes refers to two-dimensional codes as barcodes. Since it is a computer-implemented method, the steps for reading a barcode proceed automatically.

The object is also satisfied by a code-reading device for reading a one-dimensional optical code, comprising at least one light-receiving element for capturing image data with the code and a control and evaluation unit configured for carrying out a method according to the invention.

Image data are captured with the code. A matrix camera can be used for this purpose. The repeated capture with a line scan camera, in particular with a relative movement between code and line scan camera and combining the successively captured image lines into a two-dimensional image, is also conceivable. The intensity profile of a code scanner can also be interpreted as an image line. Due to the two-dimensional image or repeated line capture, the code is captured a plurality of times, and therefore a plurality of grayscale value profiles through the code can be obtained. Each grayscale value profile represents the code; in this sense, the plurality of grayscale value profiles is redundant. The differences between the grayscale value profiles mean that this is not a complete redundancy, and therefore the overdetermination of the plurality of grayscale value profiles can be used to achieve more robust reading results. In line with code scanners, a grayscale value profile is also referred to as a scan; in somewhat advanced understanding, it is an intensity profile or the image data along a line through the code, e.g., in 256 grayscales with eight-bit color or grayscale value depth.

By means of binarization, a black-and-white profile, which now only has one-bit color or grayscale value depth, is formed from the grayscale value profiles, and the code content of the code is read therefrom. The binarization can take place in any manner known per se, including intelligent or local thresholds or a preceding differentiation, or the use of methods of machine learning, and in particular neural networks. Likewise, any conventional decoder or machine-learning method can be used for the code reading.

The invention start from the basic idea of generating a sharpened grayscale value profile from the plurality of grayscale value profiles, utilizing the redundancy thereof in order to support and prepare the binarization. The sharpened grayscale value profile may have an increased resolution (upsampling, super resolution). In addition, the edges and extrema may be sharpened (deblurring, amplitude spread); so that they are more pronounced than in the original image data. Blurred edges become sharper and steeper, the grayscale values for bars become darker, and the grayscale values for gaps become lighter. Subsequent binarization is thus significantly easier.

In a preferred embodiment, resolution increase and sharpening are separate steps. However, it is also conceivable that no grayscale value profile having just higher resolution and not yet increased sharpness is generated as an explicit intermediate result. Particularly in implementations with a neural network, intermediate results can remain hidden in feature maps of the hidden layers, and, on the output side, the finished, sharpened grayscale value profile having both improvements can directly result. In general, various steps of the method according to the invention are provided, like resolution increase, sharpening, binarization, and code reading, which can each be carried out classically or with a machine-learning method. Various mixed forms of classic steps and those of machine learning are possible, and, particularly in the case of the implementation of steps with neural networks, individual neural networks can be implemented for each step or for a plurality of successive steps.

The invention has the advantage that a particularly large number of barcodes are successfully decoded, and therefore the reading rate rises. Blurred and low-resolution grayscale value profiles and others that are captured in low quality can also be precisely binarized, and the code be read as a result. This applies in particular to the critical cases of small module sizes, i.e. pixels per smallest bar or smallest gap, in particular, module sizes in the range of one or even less. The method according to the invention can be used in parallel operation with other code-reading methods, or be used only when the other code-reading methods fail.

Preferably, the image data are segmented in pre-processing in order to find an image region with the code. As a result, the reading of barcodes is limited to regions of interest where a barcode is actually found, at least with high probability. The segmentation is preferably carried out in a component other than the subsequent code reading, in particular, with segmentation in an FPGA (field programmable gate array) and code reading in a CPU (microprocessor). In addition, reference is made here to EP 2 555 160 B1 cited in the introduction. The FPGA can process at least parts of the method according to the invention, in particular, by means of a neural network implementing early layers on the FPGA as in EP 3 916 633 A1, also cited in the introduction.

Preferably, in pre-processing, an orientation of the code in the image data is determined, in particular in the context of the segmentation. The ideal reading direction runs transversely to the bars of the barcode, while, conversely, reading is not possible when the reading direction is longitudinal with respect to the bars. If the orientation of the code is known, suitable grayscale value profiles can be obtained. Preferably, only a selection between horizontal and vertical takes place, in order to be able to use lines or columns of the image data. Although the ideal reading direction perpendicular to the bars is generally oblique, an oblique grayscale value profile has grayscale value jumps due to the discrete grid of the image data. These two criteria must be weighed against each other. In order to distinguish between horizontal and vertical, a type of test cross with two lines perpendicular to one another can be formed. Then, one of the two lines crosses a higher number of bars and gaps or light-dark transitions, and thereafter the orientation of the code is determined.

Preferably, in order to prepare the binarization, a higher-resolution grayscale value profile is generated from the plurality of grayscale value profiles. As already mentioned above, in this embodiment, two separate steps of increasing the resolution and sharpening are performed. The redundant plurality of grayscale value profiles is used to generate a higher-resolution grayscale value profile. Corresponding methods for increasing the resolution (super resolution) are known per se; there are classic algorithms as well as machine-learning methods, in particular using neural networks.

Preferably, the sharpened grayscale value profile is generated from the higher-resolution grayscale value profile by a deconvolution method. A deconvolution is a classic method, not a machine-learning method and in particular not a neural network. A Richardson-Lucy deconvolution is particularly suitable for barcodes.

Alternatively, the sharpened grayscale value profile is generated from the higher-resolution grayscale value profile by a machine-learning method. Classic approaches, such as the Richardson-Lucy deconvolution, are able to work with relatively low computing resources. However, they have the disadvantage that they must be parameterized by hand for good results. This is not necessary with a machine-learning method that is data-driven and moreover often achieves better results.

The machine-learning method preferably has a neural network, and in particular a convolutional neural network with a filter core of a width corresponding to a module size of the code in the higher-resolution grayscale value profile. There is a huge pool of usable software packages available for neural networks, in particular, deep neural networks with hidden layers ("deep learning"), and, if required, dedicated hardware is available as well. In the context of image processing, convolutional neural networks (CNN) are particularly suitable. The desired binarization depends strongly upon local neighborhood relations, wherein influences beyond a module are more likely to interfere than help. Therefore, a convolutional neural network with a filter core on the order of magnitude of the module size is particularly well adapted to the intended application. The invention is primarily aimed at low-resolution code captures with module sizes in the range of one pixel or below. After the increase in resolution, there results a module width of a few pixels, e.g. five pixels, and accordingly, a filter core of a width corresponding to the module width is selected, like five pixels in the example. A somewhat narrower or wider filter core is also possible, but it should preferably not be a multiple of the module width. However, the adaptation of the filter cores to the module variable is not mandatory; the neural network can also adapt to less favorable initial conditions by learning. The width of the filter core relates to the first layer or early layers; in later layers, the repeated convolutions can anyway cause the local context to spread to larger neighborhoods.

Preferably, a higher-resolution grayscale value profile or the sharpened grayscale value profile is generated from the plurality of grayscale value profiles by a machine-learning method, in particular a convolutional neural network. For this purpose, the plurality of grayscale value profiles are preferably superimposed on one another and fed in this way as a 2D image on the input side. In the first alternative, the machine-learning method then makes the increase in resolution in a separate intermediate step, as already addressed as a possibility above. In the second alternative, the two steps of increasing the resolution and sharpening are combined in one machine-learning method. It is then open as to whether the machine-learning method explicitly performs an increase in resolution as an intermediate step; generally, this is not the case, and, in any case, this is a purely internal intermediate result, for example, in the form of feature maps of hidden layers. In any case, the increase in resolution can be seen to be represented internally in some form, because the resulting sharpened grayscale value profile is improved both in its resolution and its sharpness.

The machine-learning method is preferably trained by means of supervised learning on the basis of training data which assign a grayscale value profile and a black-and-white profile to one another, wherein the training data are obtained from a predetermined code content or a successfully read code. The supervised learning makes it possible to generalize, from a training data set with examples of a predetermined correct evaluation, to output images presented later during operation. Corresponding architectures of neural networks and algorithms for training as well as operation (inference) are known per se, so that well-functioning solutions can be drawn upon or used. A typical difficulty is the generation of training data records. In this embodiment, it is achieved in two possible ways, which are used individually or in combination. On the one hand, a code content can be predefined, an ideal black-and-white profile constructed therefrom, and the latter distorted in various ways to form a grayscale value profile. On the other hand, real code images can be read. The black-and-white profile is then either the binarization of a successful read attempt or a black-and-white profile reconstructed from the read code content, and the grayscale value profiles are taken from the image data of the code images. The grayscale value profiles are the training examples; the black-and-white profile is the associated desired result to be trained (label; ground truth).

Preferably, the resolution of the training data is reduced to obtain training data with a small module size. Successful read attempts from which training data are obtained are typically of higher resolution. The motivation of the invention is specifically the fact that problem cases with small module sizes frequently cannot be read. Nevertheless, in order to be able to use training examples from the field, in this embodiment, the originally high-resolution grayscale value profiles of the real code images are artificially brought to a low resolution, and thus to a small module size (downsampling). For this purpose, a black-and-white profile is either newly constructed in low resolution or is likewise adapted by reducing the resolution.

The image data are preferably captured in a relative movement of a light-receiving element and a code-carrying object—in particular, line-by-line. The light-receiving element is part of a code-reading device, and the relative movement is preferably produced in that code-bearing objects are conveyed, for example, on a conveying device through the reading field of the stationarily-mounted code-reading device.

The code-reading device according to the invention for reading a one-dimensional optical code has at least one light-receiving element for capturing image data with the code and a control and evaluation unit configured for carrying out one of the described embodiments of the method according to the invention. The code-reading device can be a barcode scanner, e.g. with a photodiode as a light-receiving element, and the intensity profiles of the scans are then the plurality of grayscale value profiles which are directly processed or are preferably first combined line-by-line to form the image data. Preferably, the code-reading device is a camera-based code reader with an image sensor as a light-receiving element. The image sensor can in turn be a line sensor for detecting a code line or a two-dimensional code image by combining image lines, or a matrix sensor, wherein images from a matrix sensor can also be combined to form a larger output image. A combination of a plurality of code readers or camera heads is also conceivable. The control and evaluation unit can itself be part of a barcode scanner or a camera-based code reader, or attached thereto as a controller.

Figure 2:
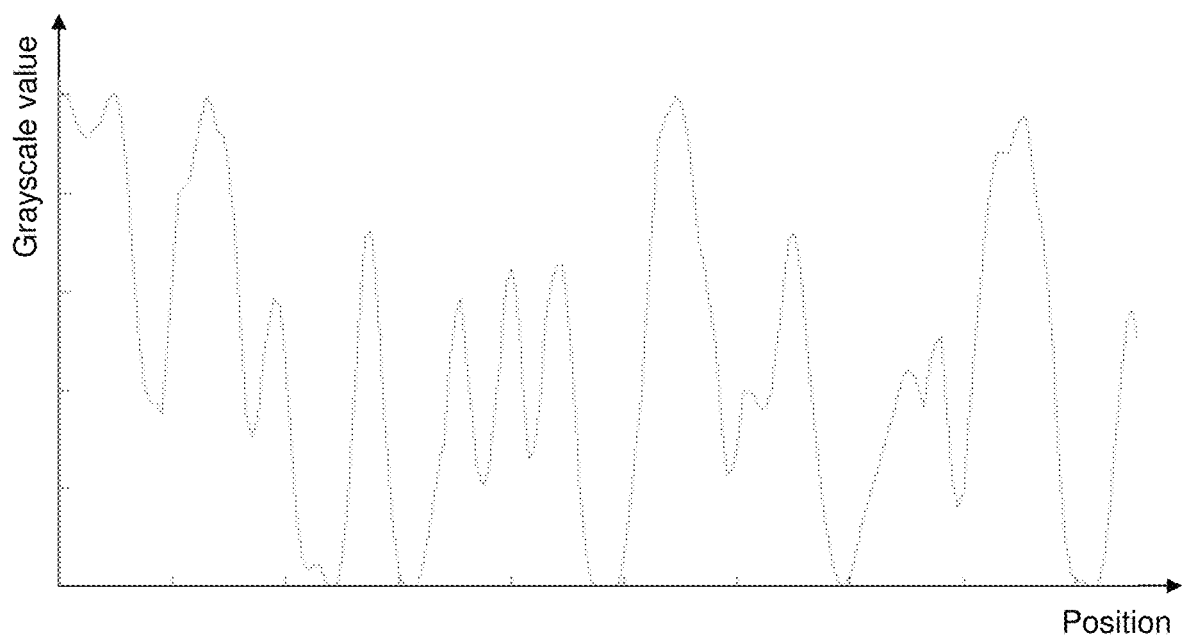
Figure 3:
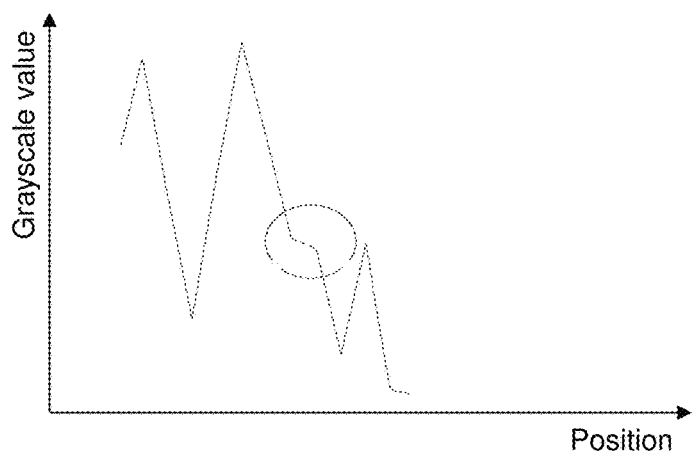
Figure 4:
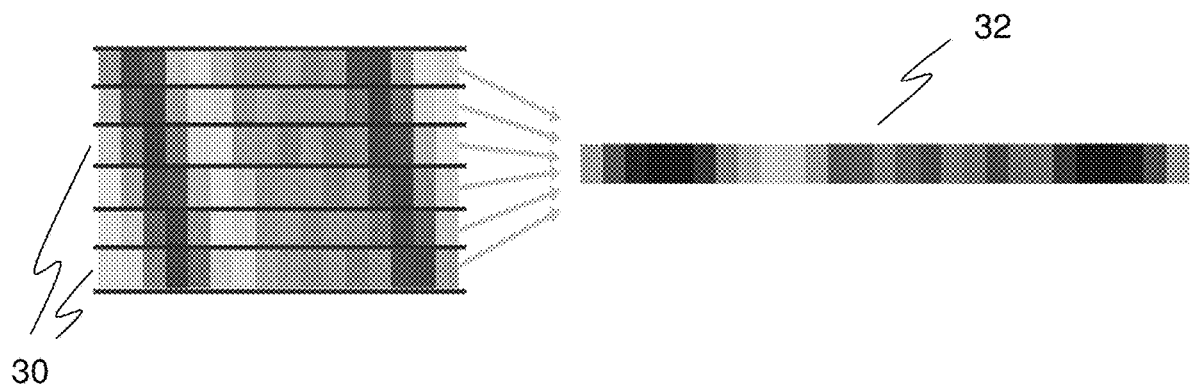
Figure 6:
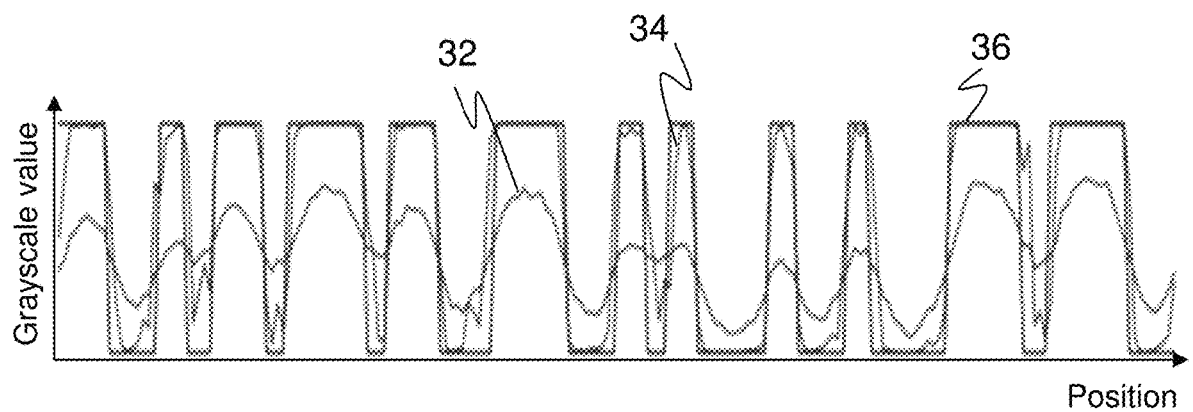
Figure 7A:
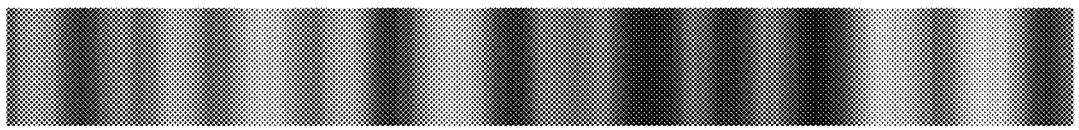
Figure 7B:
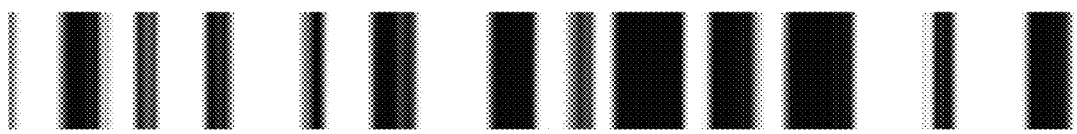
Figure 7C:
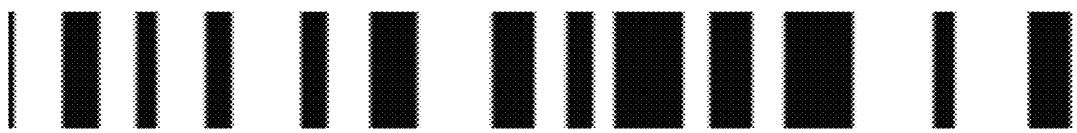
Figure 7D:
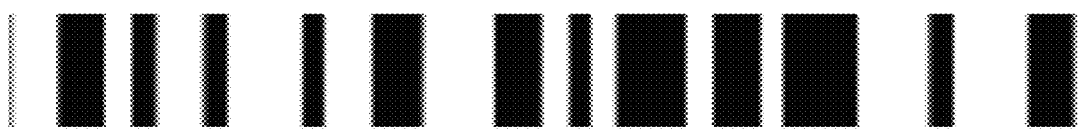
Figure 8:
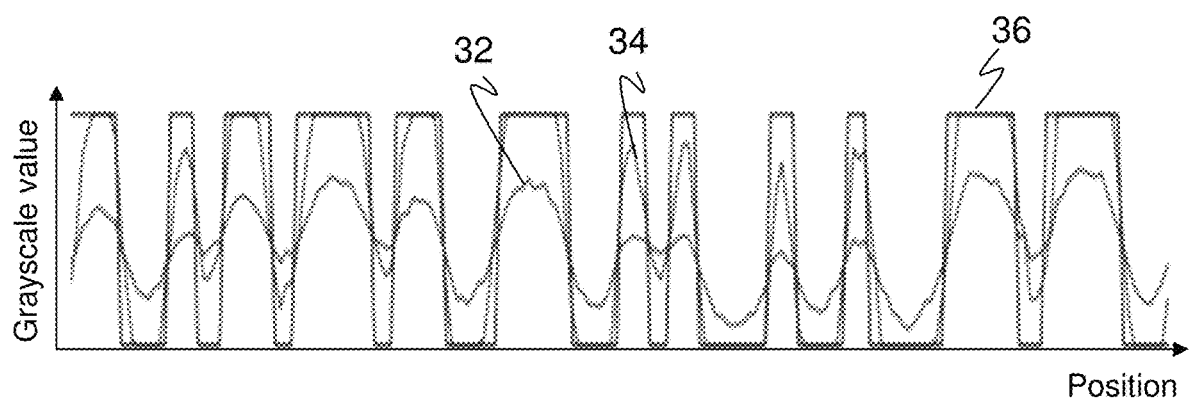
Figure 9A:
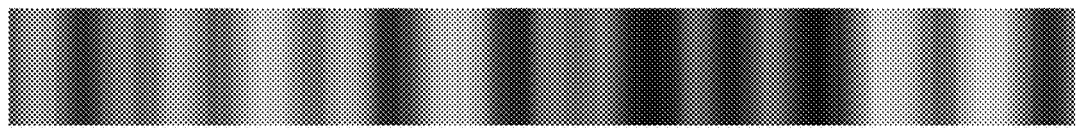
Figure 9B:
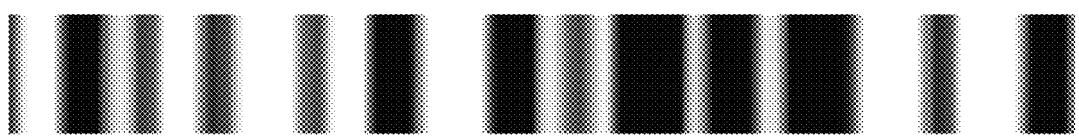
Figure 9C:
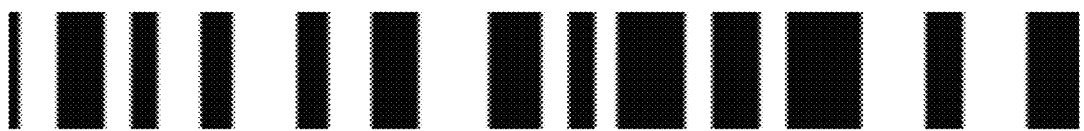
Figure 9D:
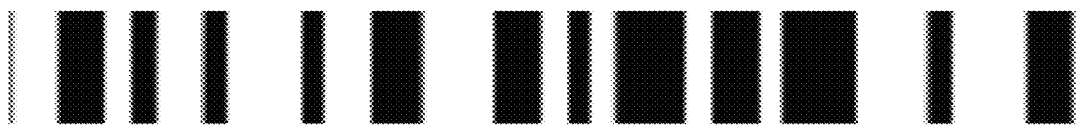

The invention is explained in more detail below, also with respect to further features and advantages, by way of example based upon embodiments and with reference to the attached drawing. The figures of the drawing show:

FIG. 1 a schematic, three-dimensional overview of the exemplary mounting of a code reader over a conveyor belt on which objects with codes to be read are conveyed;

FIG. 2 an exemplary grayscale value profile through a bar code;

FIG. 3 an exemplary detail of a grayscale value profile through a barcode with a light-dark transition that is difficult to see;

FIG. 4 a schematic illustration of the generation of a higher-resolution grayscale value profile from a plurality of low-resolution grayscale value profiles;

FIG. 5 a code example of the architecture of a neural network for sharpening a grayscale value profile;

FIG. 6 a comparative illustration of an original grayscale value profile, a sharpened profile, and a desired ideal black-and-white profile upon sharpening with a neural network;

FIG. 7a a detail of a code image with original grayscale value profiles;

FIG. 7b the detail according to FIG. 7a after application of a neural network for sharpening;

FIG. 7c the detail according to FIG. 7b after binarization to form a black-and-white profile;

FIG. 7d a comparison detail with ideal black-and-white profile (ground truth);

FIG. 8 a comparative illustration of an original grayscale value profile, a sharpened profile, and a desired ideal black-and-white profile during sharpening using Richardson-Lucy deconvolution;

FIG. 9a a detail of a code image with original grayscale value profiles;

FIG. 9b the detail according to FIG. 9a after application of a Richardson-Lucy deconvolution;

FIG. 9c the detail according to FIG. 9b after binarization to form a black-and-white profile; and FIG. 9d a comparison detail with ideal black-and-white profile (ground truth).

FIG. 1 shows an opto-electronic code reader 10 in a preferred application situation mounted above a conveyor belt 12, which conveys objects 14, as indicated by the arrow 16, through the detection region 18 of the code reader 10. The objects 14 bear on their outer surfaces code regions 20, which are detected and evaluated by the code reader 10. These code regions 20 can be recognized by the code reader only when they are attached to the upper side, or at least attached so as to be visible from above. Therefore, deviating from the illustration in FIG. 1, for reading a code 22 that is attached to the side or at the bottom, a plurality of code readers 10 can be mounted from different directions in order to enable so-called omnireading from all directions. In practice, the plurality of code readers 10 are typically arranged as a reading tunnel to form a reading system. This stationary application of the code reader 10 to a conveyor belt is very common in practice. However, the invention relates to the code reader 10 itself or to the method implemented therein for decoding codes, so that this example is not to be understood as limiting.

Using an image sensor 24, the code reader 10 detects image data of the conveyed objects 14 and the code regions 20, which are further processed by a control and evaluation unit 26 by means of image evaluation and decoding methods. The specific imaging method is not crucial to the invention, such that the code reader 10 can be constructed according to any principle known per se. For example, only one line is detected, either by means of a line-shaped image sensor or a scanning method, wherein, in the latter case, a simple light receiver, such as a photodiode, is adequate as image sensor 24. The control and evaluation unit 26 evaluates the captured lines or assembles the lines captured during the conveying movement to form the image data. With a matrix-like image sensor, a larger region can already be detected in one image, wherein the assembling of images is also possible, both in the conveying direction and transversely thereto. It is possibly that only a plurality of code readers 10 can cover the entire width of the conveyor belt 12 jointly, wherein each code reader records only a partial section, and the subsections are assembled by image processing (stitching). Also conceivable is a decoding that is only fragmented within individual subsections, with subsequent assembling of the code fragments.

The code reader 10 outputs information, such as read codes or image data, via an interface 28. It is also conceivable that the control and evaluation unit 26 is not arranged in the actual code reader 10, i.e. in the camera shown in FIG. 1, but is connected to one or more code readers 10 as a separate controller. The interface 28 then also serves as a connection between internal and external control and evaluation. In effect, the control and evaluation functionality can be distributed as desired to internal and external components, wherein the external components can also be connected via network or cloud. This is not further distinguished here, and the control and evaluation unit 26 is considered to be part of the code reader 10, irrespective of the specific implementation. The control and evaluation unit 26 can have a plurality of components, such as an FPGA (field programmable gate array), a microprocessor (CPU), and the like. Particularly for evaluation steps using a machine-learning method yet to be described, and in particular using a neural network, specialized hardware components can be used, for example, an AI processor, an NPU (neural processing unit), a GPU (graphics processing unit), or the like.

FIG. 2 shows an exemplary grayscale value profile along a line through a barcode. As part of the code reading, the grayscale value profile is to be binarized in order to determine the distances between the light-dark transitions or dark-light transitions and thus the code content from the resulting black-and-white profile. Most bars and gaps, i.e. the dark and light areas of the barcode, can be recognized as distinct minimums and maximums of the grayscale values. In addition, there are saddles, double peaks, and less distinct extrema, where the naked eye cannot so clearly decide whether this is a transition between bar and gap or only an interference or inaccuracy of the grayscale value capture. At these locations, errors in the binarization and, as a result, an incorrect or non-read barcode can still occur, even with locally adapted thresholds.

FIG. 3 shows a detail of a grayscale value profile as in FIG. 2. At the circled location, a thin gap of the barcode is not reflected as a maximum and not even as a saddle point, but only as a limited slope. The motivation of the invention can thus be summarized in that, by processing the grayscale value profiles, an initial situation is to be created in which binarization arrives at the correct result even at such problematic locations.

The basic principle of the invention is therefore to not immediately subject the original grayscale value profile to a binarization algorithm, but rather to use a nonlinear filter beforehand, which improves the grayscale value profile with respect to the subsequent binarization. Particularly with grayscale value profiles that are low-resolution and unsharp at the same time, as in the example in FIG. 3, such a non-linear filter can work out information for the binarization which is not accessible with conventional methods. In an embodiment explained in more detail later with reference to FIGS. 5 through 7, this filter can be implemented by a machine-learning method, in particular, a neural network (data-driven approach) that has been trained to improve the quality of poorly-readable grayscale value profiles. Alternatively, in an embodiment explained in more detail with reference to FIGS. 8 and 9, a classic method can be used. The filter generates a sharpened grayscale value profile from a respective original grayscale value profiles, so that there are still gray values of for example 8 bits of color or grayscale value depth on the input side as well as on the output side. Subsequently, with a comparatively simple binarization algorithm, the color depth is reduced to one bit. Here, practically any binarization algorithm known per se can be used, for example a conventional differential or threshold algorithm. In principle, it is conceivable to also use a machine-learning method for binarization, in particular also the same machine-learning method of the filter, so that a black-and-white profile is generated as output data directly from the original grayscale value profiles as input data.

FIG. 4 illustrates an additional preparation step in which a plurality of original grayscale value profiles 30 are first processed to a higher-resolution grayscale value profile 32 (super resolution). Said non-linear filter for sharpening preferably receives the higher-resolution grayscale value profile 32 as input. The plurality of grayscale profiles 30 preferably follow a plurality of lines through the same barcode, in particular by processing a two-dimensional region of the barcode instead of a single line. The two-dimensional image region does not have to be taken directly from the detection of the barcode; for example, grayscale value profiles 30 can be brought closer together from larger distances in the vertical direction or aligned with one another in the horizontal direction. Whether the input data are referred to as a two-dimensional image region or as a plurality of lines is not of further concern for the method. It is advantageous for the lines to lie along image lines or image columns. The optimal orientation perpendicular to the bars of the barcode is then generally only approximately achievable by selecting either the image lines or the image columns. However, even with conceivable oblique lines through the image of a barcode, interfering discretization artifacts can occur. In the illustration in FIG. 4, the plurality of original grayscale profiles 30 have already been oriented in a suitable direction transverse to the barcode. This preparation step can be omitted, but the non-linear filter must then additionally cope with the degree of rotational freedom, which in particular requires a considerably larger number of training examples when a machine-learning method is used.

The increase in resolution is advantageous because the invention is primarily intended for bar codes captured with low resolution, i.e small module sizes in the range of one pixel per module or lower. As a rule, conventional binarizations without special pre-processing can be used with larger module sizes, although the invention naturally also remains applicable for such barcodes. As a result of a plurality of original grayscale value profiles 30 being included, the information redundancy of bar codes is advantageously utilized, which in code-reading applications anyway is captured repeatedly in terms of space and time. Alternatively, it would also be conceivable to use only a single grayscale value profile as input, the resolution of which can likewise be increased by interpolation. In contrast to the procedure illustrated in FIG. 4 with a plurality of grayscale value profiles 30 as input, however, interpolation does not broaden the information base.

The higher-resolution grayscale value profile 32 is the starting point for a subsequent sharpening which is now to be described, in which transitions between bars and gaps are sharpened, and the grayscale value profiles of bars and gaps become darker or lighter. The desired result comes as close as possible to a binary light-dark profile with very steep edges, but still expressed in grayscale values. The higher-resolution grayscale value profile 32 need not necessarily be generated as an explicit intermediate result. Particularly when using machine-learning methods, the resolution increase and the sharpening can take place in one step. The increase in resolution is then an implicit part of this method. Similarly, instead of being a separate step, binarization can be incorporated into the machine-learning method. Here, it is to be decided in each case between the training of several simpler sub-steps or of a common, but thus more complex step. Since very simple known classic methods are available for some sub-steps, such as binarization, the approach using a monolithic, highly complex neural network is not necessarily advantageous for all sub-steps.

In the following, the non-linear filter for sharpening the higher-resolution grayscale value profile 32 is explained in more detail in two embodiments. The first embodiment is based upon a machine-learning method, in this case using the example of a neural network, and is illustrated in FIGS. 5 through 7. The second embodiment is based upon a classic method, in this case the example of a Richardson-Lucy deconvolution, and is illustrated in FIGS. 8 and 9.

FIG. 5 shows a detail of a program code (code snippet) for generating an exemplary neural network which can be used as a non-linear filter for sharpening a grayscale value profile. Preferably, a higher-resolution grayscale value profile 32 is fed in at the input with, by way of example, 3,991 consecutive grayscale values. For the alternative direct processing of a plurality of original grayscale value profiles 30, the architecture is preferably adapted, for example, to feed several shorter lines instead of one long line, and also to adapt the architecture in accordance with the first sub-goal of a single, higher-resolution line.

The exemplary neural network is a convolutional neural network (CNN) with several hidden layers. The kernel size is selected to be N=5. This matches a module size five; with this module size, a kernel detects approximately one module in each case. This exemplary module size is created when a barcode originally captured with module size <1.5 is initially brought to a five-fold resolution or module size by increasing the resolution. In other words, the kernel then corresponds to a real pixel of the original low-resolution image of the barcode. The kernel can be slightly wider or narrower. 1D convolutional layers with a kernel size N or 2D convolutional layers with a kernel size N×1 may be used. The sample network of FIG. 1 uses 1D convolutional layers in the early layers and 2D convolutional layers in later layers. The architecture can be varied in terms of its depth and width; it is only relevant that sharpened grayscale value profiles are generated after training so that the code content can be read.

The exemplary convolutional neural network operates with a stride one (strides=1), since the sharpened grayscale value profile is preferably to be of the same size at the output as the incoming grayscale value profile. Valid padding and the activation function ReLu have proven successful in test runs; variations are conceivable here.

For the supervised training (supervised learning) of the convolutional neural network, examples with grayscale value profiles and respective matching black-and-white profiles are required as label or ground truth. During training, the grayscale value profiles are presented on the input side, and the neural network learns from the error between the output-side prediction or the binarization thereof and the correct black-and-white profile of the learning data record in each case by corresponding adaptation of the weights. The black-and-white profile to be learned is preferably ideal, so it changes in accordance with the code content on one edge over only one position from maximally light to maximally dark and vice versa in each case. This strict requirement does not necessarily have to be fulfilled as long as it is a black-and-white profile that leads to reading success in a suitable decoder. Incidentally, reference is made to a black-and-white profile, i.e. a profile with only one-bit color depth. For training, a grayscale value profile which assumes only the extreme grayscale values, e.g., at 0 and 255 or another very low and high grayscale value, is equivalent. A distinction between them is no longer specifically made.

For an application-related performance, it is advantageous if the learning is based upon real example images. In this way, the convolutional neural network is trained as well as possible in effects that occur in practice, and above all in combinations of said effects. Preferably, barcodes having larger module widths are captured for this purpose, so that it is ensured that the code content can be read, and thus a correct black-and-white profile is present or can be reconstructed from the code content. The grayscale value profiles are scaled down (downsampling) in order to artificially and subsequently bring about the situation of a captured barcode with a small module size of, for example, 0.75 pixels per module. The resolution of the associated black-and-white profiles is reduced accordingly.

In order to reduce discretization or scanning artifacts during the reduction in resolution, it is advantageous to first use a prefilter that is dependent upon the target resolution, and then to scan the filtered signal in the target resolution. Alternatively, in the case of an integer scaling factor, a simple averaging is sufficient. Another possibility is a weighted averaging, for example $(0.5*x1+x2+x3+x4+0.5*x5)$ for a respective neighborhood $x1 \ldots x5$ of pixels with a stride of three pixels and a scaling factor of three. This operation produces a stronger blurring, which may be desirable for learning that is intended to cover such critical situations.

Instead of that, or in order to increase the amount of training data, it is also possible to use artificially generated grayscale value profiles and matching black-and-white profiles. Such profiles can be generated from the code content, wherein various distortion filters should be applied at least to the grayscale value profiles in order to at least get closer to real image captures. Moreover, such distortion filters are also suitable for deriving additional learning data records from existing learning data records.

Since the convolutional neural network is thus trained on a specific module size, it may be useful to rescale the fed-in grayscale profiles to this trained module variable prior to the inferences during operation. In particular in the case of non-integer rescaling, however, it should be carefully weighed whether or not artifacts are introduced which negate an advantage of the appropriate module size just by the rescaling.

FIG. 6 shows an exemplary result of an application of the trained convolutional neural network. The input signal is the higher-resolution grayscale value profile 32. As already explained with respect to FIGS. 2 and 3, not all extrema and edges are clearly visible, and, in effect, the available grayscale value range is not saturated anywhere. By contrast, the sharpened grayscale value profile 34 that the convolutional neural network generates varies with very steep edges between minimum and maximum brightness. Largely, the sharpened grayscale value profile 34 is identical to the ideal black-and-white profile 36 (ground truth). A deviation can still be seen at the edges and in some extrema. As is evident, a simple threshold can be set at a mean grayscale value so that binarization comes at least very close to the ideal black-and-white profile 36. The criterion is not perfection anyway, but the creation of the prerequisite for a successful code read.

FIGS. 7a-d show the result in an alternative representation. In FIG. 7a, the higher-resolution grayscale value profile 32 is now multiplied and reproduced one above the other, like an image region. The image is blurred and of low contrast. FIG. 7b shows a corresponding representation of the sharpened grayscale value profiles 34. If at all, grayscale values that are not white or black can be found only at some transitions. FIG. 7c shows a corresponding binarization result, which now eliminates said grayscale values by their being assigned to white or black. FIG. 7d is a corresponding representation of the ideal black-and-white profile 36. If FIGS. 7c and 7d are compared, some bars that are slightly too narrow still remain. However, a decoder copes with this, for as long anyway as such width differences of bars and gaps remain clearly below the module size, but otherwise also by means of multiple attempts, error corrections, and the like.

In a further embodiment, the non-linear filter can, alternatively to a machine-learning method, be implemented as a classic method. This is explained using the example of the Richardson-Lucy deconvolution, an iterative algorithm with the aim of removing blurring arising during the capture from a signal (deblurring). In this case, a point spread function is taken as the basis, and it is assumed that the blurring in the optical system has arisen as a result of a convolution with this point spread function. Accordingly, the blurring can then be eliminated by deconvolution.

Preferably, it is first estimated whether the input-side higher-resolution grayscale value profile 32 has any blurring at all. If this is the case, a number of Richardson-Lucy iterations, that is preferably determined beforehand, are executed, after which the sharpened grayscale value profile 34 is available. For example, the Gaussian blurring function is assumed to be the point spread function. The width of the blurring function can be selected as a function of the previously estimated blurring. The number of iterations is a tradeoff between available computing time, desired sharpening, and possible artifacts due to overcorrection. Said point spread function has proven itself empirically. The number of iterations and the suitable point spread function can be varied and selected based upon the results.

FIG. 8 is also constructed like FIG. 6 and shows a comparative result of a higher-resolution grayscale value profile, grayscale value profile 34, now sharpened by means of a classic method instead of the machine-learning method, in particular in the example Richardson-Lucy deconvolution instead of convolutional neural network, and ideal black-and-white profile 36. In this embodiment too, a significant improvement is achieved by the non-linear filter, even if the convolutional neural network proves to be somewhat more effective in the examples shown. However, after binarization, no relevant problems remain.

FIGS. 9a-d show the result again analogously to FIGS. 7a-d, with the higher-resolution grayscale value profiles 32 in FIG. 9a, the grayscale value profiles 34, which are sharpened by means of Richardson-Lucy deconvolution, in FIG. 9b, the associated binarization result in FIG. 9c, and the ideal black-and-white profiles 36 in FIG. 9d.

The two embodiments explained in more detail with reference to FIGS. 5 through 9 are based upon the higher-resolution grayscale value profile 32 as an input variable. It has already been mentioned that the two steps of increasing the resolution and sharpening can also take place together. In particular, a convolutional neural network is trained which receives, as a two-dimensional input variable, an image corresponding to FIG. 4 (left) with a plurality of original grayscale profile values 30, which are optionally aligned with one another in the line direction, and then delivers the sharpened grayscale value profile 34 by means of 2-D convolutions, with the omission of an explicit output of a higher-resolution grayscale value profile 32. Optionally, the convolutional neural network can also learn the binarization, wherein this step becomes very simple due to the processing, and therefore a classical treatment can be more advantageous.

The invention claimed is:

1. A method for reading a one-dimensional optical code, wherein image data including the code are captured and a plurality of grayscale value profiles through the code are obtained from the image data,
wherein a black-and-white profile is formed from the grayscale value profiles by binarization,
wherein code content of the code is read from the black-and-white profile,
wherein, for preparing the binarization, a sharpened grayscale value profile is first generated from the plurality of grayscale value profiles, the sharpened grayscale value profile having, as compared to the image data, at least one of increased resolution, sharper edges, and more pronounced extrema, and
wherein the sharpened grayscale value profile is binarized to form the black-and-white profile.

2. The method according to claim 1,
wherein the image data are segmented in a pre-processing step in order to find an image region with the code, wherein the pre-processing step is performed after the image data is captured and before the obtaining of the plurality of the grayscale value profiles.

3. The method according to claim 1,
wherein an orientation of the code in the image data is determined in a pre-processing step, wherein the pre-processing step is performed after the image data is captured and before the obtaining of the plurality of the grayscale value profiles.

4. The method according to claim 1,
wherein the sharpened grayscale value profile has the increased resolution compared to the image data.

5. The method according to claim 4,
wherein the sharpened grayscale value profile is generated by a deconvolution method.

6. The method according to claim 5,
wherein the sharpened grayscale value profile is generated by a Richardson-Lucy method.

7. The method according to claim 4,
wherein the sharpened grayscale value profile is generated using a machine-learning method.

8. The method according to claim 7,
wherein the machine-learning method comprises a neural network.

9. The method according to claim 7,
wherein the machine-learning method comprises a convolutional neural network having a filter core of a width corresponding to a module size of the code in the sharpened grayscale value profile.

10. The method according to claim 7,
wherein the machine-learning method is trained by means of supervised learning based on training data that assign a grayscale value profile and a black-and-white profile to one another, and wherein the training data are obtained from a predetermined code content or a successfully read code.

11. The method according to claim 10,
wherein a resolution of the training data is reduced to obtain training data with a module size of one pixel per module or less.

12. The method according to claim 1,
wherein the image data are captured in a relative movement of a light-receiving element and a code-carrying object.

13. The method according to claim 12,
wherein the image data are captured line-by-line.

14. A code-reading device for reading a one-dimensional optical code, comprising at least one light-receiving element for capturing image data with the code, and a control and evaluation unit configured for carrying out a method according to claim 1.

* * * * *